(No Model.)

A. J. MASSEY & J. W. STALLINGS.
STRAINER FOR COFFEE POTS.

No. 559,459. Patented May 5, 1896.

UNITED STATES PATENT OFFICE.

ANDREW J. MASSEY, OF SHILO, AND JAMES W. STALLINGS, OF DALLAS, TEXAS.

STRAINER FOR COFFEE-POTS.

SPECIFICATION forming part of Letters Patent No. 559,459, dated May 5, 1896.

Application filed February 15, 1896. Serial No. 579,419. (No model.)

*To all whom it may concern:*

Be it known that we, ANDREW J. MASSEY, of Shilo, Denton county, and JAMES W. STALLINGS, of Dallas, Dallas County, Texas, have invented a new and useful Improvement in Strainers for Coffee-Pots, of which the following is a specification.

The object of our invention is to provide peculiar mechanism by which the steam from the fluid coffee which has passed through the percolating-cloth to the base of the coffee-pot can rise above the strainer, there condense, and then return again through the strainer, thus causing a thorough extraction of the strength of the coffee.

Our invention consists in the novel construction and arrangement of parts hereinafter fully described, and pointed out in the claim hereto appended.

Figure 1:
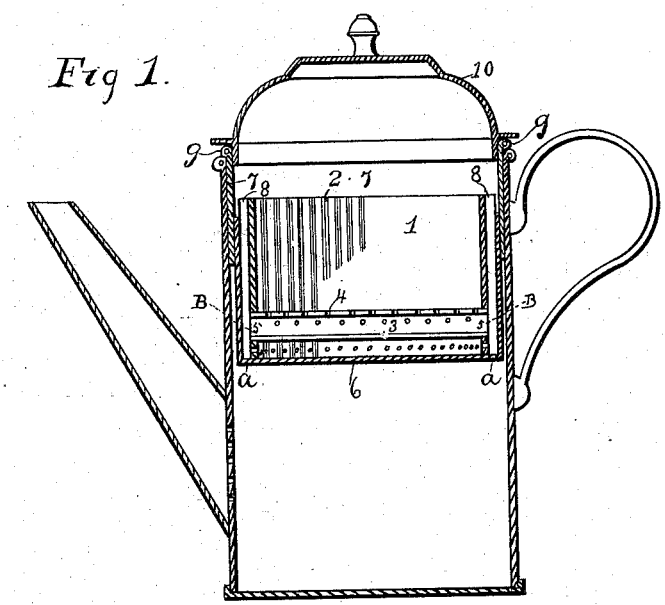
Figure 2:
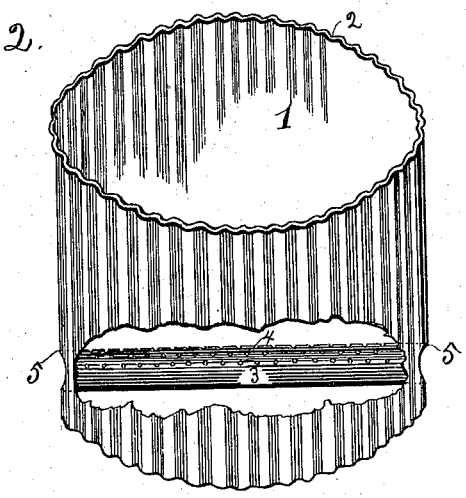

In the drawings, Figure 1 is a sectional view of a coffee-pot provided with as trainer constructed in accordance with our invention, and Fig. 2 is a perspective view of the strainer-sleeve.

Similar numerals and letters of reference refer to similar parts throughout the two views.

1 is a conical strainer-sleeve provided with vertical corrugations 2 and a horizontally-disposed tube 3, having perforations 4 on its uppermost side, said tube being rigidly secured to the walls of the corrugated sleeve at ends 5 5. The percolating-cloth 6 is secured around the lower end of the strainer-sleeve by a conical band 7, which is just large enough to tightly clamp the percolating-cloth around the sleeve. It will be observed that, the strainer-sleeve being corrugated, there will be small spaces 8 between the outer side of the strainer-sleeve and the percolating-cloth. The upper edge of the clamping-band 7 is provided with a flange 9, which rests on the upper edge of the coffee-pot. After the strainer is inserted in position the lid 10 is fitted over the coffee-pot.

We are aware that there are several strainers similar to ours already in use; but none of them are so constructed that the steam from the fluid coffee, which has passed through the percolating-cloth to the base of the pot, can rise to the space above the strainer, there condense, and then descend through the percolating-cloth to the fluid coffee below, thereby more thoroughly extracting the strength from the coffee and resulting in a partial distillation. We meet these requirements in providing the spaces 8 around the outer sides of the corrugated sleeve. The steam arising from the fluid coffee below the strainer passes through the percolating-cloth at points indicated by the letter *a*, thence up through the spaces 8 to the space in the pot above the strainer, there condenses, and then descends, passing again through the strainer. We have also provided suitable construction in the horizontally-disposed perforated tube 3, by which a portion of the steam arising from the fluid coffee below the strainer will pass through the percolating-cloth at points indicated by letters *a a* into spaces 8, and thence into the mouths B B of the perforated tube 3, thence through the perforations of said tube into the mass of ground coffee above and around it. The steam thus diffused into the mass of coffee will further tend to extract the strength from it.

Having thus described all that is necessary for a clear understanding of our device, what we claim, and desire to secure by Letters Patent of the United States, is—

In the combination with a coffee-pot, of a strainer; consisting of a sleeve 1, having vertically-disposed corrugations 2 and having a horizontally-disposed perforated tube 3, which is rigidly secured at its ends to the walls of the sleeve, said sleeve being supported by conical band 7, which clasps the percolating-cloth 6, around the outer surface of the sleeve 1, all as substantially set forth.

ANDREW J. MASSEY.
JAMES W. STALLINGS.

Witnesses:
A. L. DIGGINS,
J. H. FURNEAUX.